Figure 1:
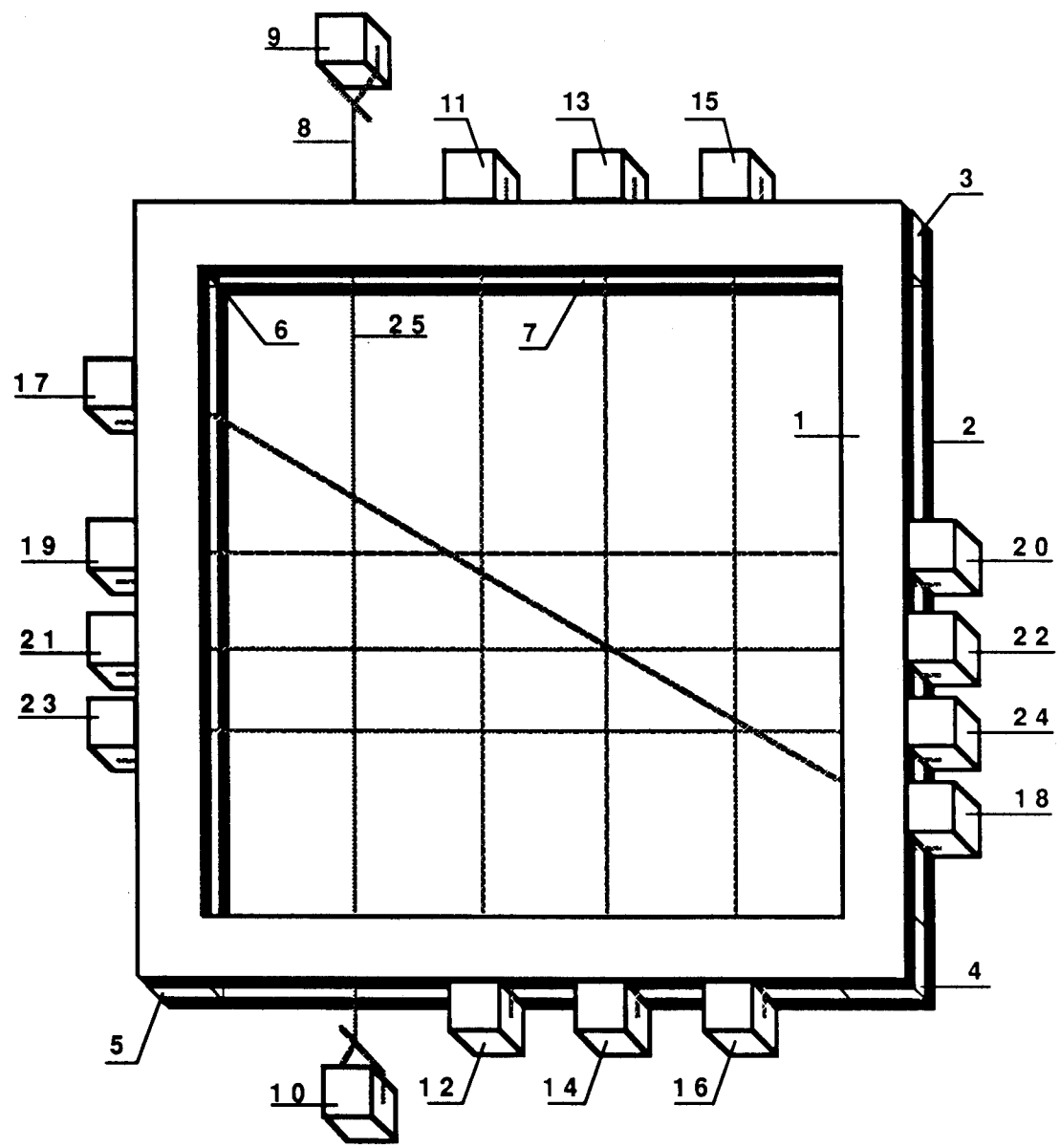

United States Patent [19]

Ragouzis

[11] Patent Number: 4,798,537

[45] Date of Patent: Jan. 17, 1989

[54] MOVABLE GRID DRAWING FRAME

[76] Inventor: Perry N. Ragouzis, 1030 Gregory Road, Fort Collins, Colo. 80524

[21] Appl. No.: 161,679

[22] Filed: Feb. 29, 1988

[51] Int. Cl.⁴ ............................................. G09B 11/00
[52] U.S. Cl. .................................................... 434/90
[58] Field of Search ...................... 434/90, 91, 92, 216; 33/1 K

[56] References Cited

U.S. PATENT DOCUMENTS

| 761,033 | 5/1904 | Cross | 434/90 X |
|---|---|---|---|
| 1,771,903 | 7/1930 | Soth | 434/90 X |
| 2,463,163 | 3/1949 | Dubner | 434/90 |
| 3,786,568 | 1/1974 | Schulte et al. | 33/1 K X |
| 3,844,049 | 10/1974 | Suvada | 434/90 X |

FOREIGN PATENT DOCUMENTS 1105333  7/1984  U.S.S.R. ............................ 33/1 K

Primary Examiner—William H. Grieb

[57] ABSTRACT

A movable grid drawing frame consisting of two square flat frames connected at their corners so as to allow a narrow slot between their respective faces. A number of elastic grid strings inserted into the slot and positioned horizontally and vertically across the drawing frame opening defined by the four sides of the frame. The elastic strings are held in place by sliders attached to the respective ends of each of the elastic grid strings thus maintaining each elastic grid string under slight tension across the drawing frame opening. The sliders to which the elastic strings are attached allow for the free positioning of elastic grid strings across the frame opening in ways that produce a variety of grid patterns through which the user may view a subject. The elastic grip string patterns possible by the arrangement are unlimited because the elastic grid strings stretch and are movable allowing in manipulation of grid string patterns to meet the individual requirements of the user.

3 Claims, 1 Drawing Sheet

U.S. Patent     Jan. 17, 1989     4,798,537

MOVABLE GRID DRAWING FRAME

BACKGROUND OF THE INVENTION

In the teaching of art one of the most basic skills to be taught is drawing. The teaching of drawing is often difficult because untutored individuals who are learning to draw, young and old alike, have difficulty perceiving the world around them in terms of the two-dimensional notation which is characteristic of the art of drawing. Beginners tend to see their surroundings three-dimensionally and are unable to easily transpose their three-dimensional perception of these surroundings into the flat two-dimensional form of a drawing on a piece of paper. The present invention is directed toward assisting individuals to perceive their world two-dimensionally, a mode of perception that facilitates drawing performance. All the same time this invention helps them to perceive inter-relationships between the various components which make up the subject(s) they intend to draw.

From an historical standpoint, the invention described here is a modern extension of a device which was in use at least as early as the 15th century. In those early days attempts to draw objects in perspective led people like Filippo Brunelleschi(1377-1466), Leonardo da Vinci(1452-1519), Albrecht Durer (1471-1528), and others, to experiment with grid frames through which they viewed their subjects. Vincent Van Gogh(1853-1890) and other of his 19th century contemporaries used such grid frames. Van Gogh is known to have used a large cumbersome grid frame made of rough wooden timers to which he attached heavy fiber ropes in the form of a fixed grid pattern. By observing the subject he wanted to draw through the grid pattern of the ropes he had stretched across his crude grid frame, he was able to carefully study the characteristics of his subject as isolated by the smaller discrete increments defined by the grid pattern through which he looked. In this way he was able to compose, draw and then paint many of the subjects for which he later became famous.

The invention described here, unlike its primitive predecessors, is an improved and portable art tool. It allows for the convenient and continuous adjustment of grid strings which make possible an infinite variety of grid string patterns and shapes that assist users to analyze and then draw the subjects that interest them.

SUMMARY OF THE INVENTION

In accordance with the present invention, two rectangular flat frames of the same size are connected to each other at their four corners. The connections at the four corners include a thin spacer so that when the two frames are connected to each other there is a narrow separation between them which is approximately one eighth inch wide. This separation provides a narrow slot running the length of each of the four sides of the frame. These slots are interrupted by the spacers located at each of the four corners of the frame assembly. Elastic strings are then fitted through the slots so they span the open area between opposite sides of the frame. The ends of each elastic string are attached to sliders, button or bead like elements which are larger than the slot. These sliders allow the elastic strings to be stretched across the frame opening. A number of such strings, attached to sliders, are installed vertically and horizontally across the frame opening. The tension of each of the elastic strings, maintained by the sliders attached to the string ends, is enough to barely stretch the elastic.

By moving the sliders laterally along the frame's edge the elastic strings, which are attached to the sliders, may be moved along the length of each of the frame's sides. This allows for the individual adjustment of each elastic string relative to its vertical, horizontal or diagonal position in the frame opening. The fact that the strings are movable along the length of each of the frame's sides allows them to be arranged in any of a number of grid patterns across the frame opening. Since the strings are made of an elastic material they may be adjusted diagonally, as well as vertically and horizontally, without losing their tension. Furthermore, because of the open slot arrangement of the frame assembly, it is also possible to cross the elastic strings in front of, or behind, any of the other strings. The ability to cross strings in this way facilitates the positioning of the elastic strings to align them with diagonal elements in the subject being drawn. This is particularly helpful when drawing subjects that are seen in perspective. In the following elaboration of this invention the frame described above will be referred to as the "drawing frame unit", and the elastic strings will be referred to as the "elastic grid strings".

To use the drawing frame unit users look through it while positioning it a comfortable distance in front of their eyes. The drawing frame unit is positioned so it frames the subject (landscape, still life, figure, etc.) to be drawn or painted. When carefully positioned between the user and the subject the drawing frame unit helps the user to compose the subject like a person might do through the viewfinder of a camera. Once the drawing frame unit is positioned to frame the desired composition the drawing frame unit's relative distance between the subject and the user's eyes is maintained. These relative distances between subject, drawing frame, and eyes are maintained while the movalbe elastic grid strings are positioned to visually divide the view of the subject into smaller more easily managed units. The user is free to move the elastic grid strings in any of a number of ways that best meet her/his creative requirements. Once the elastic grid strings have been adjusted the user is ready to prepare his/her art surface by drawing very light pencil or charcoal lines that are located on the drawing surface in the same relative positions as the elastic grid strings in the drawing frame unit. The drawing surface need not be the same size as the opening in the drawing frame unit as long as its proportions are the same. Once the drawing surface has been prepared to conform to the units defined by the elastic grid strings, it is a simple matter to transfer what is observed in each of the small grid units defined by the elastic grid strings in the drawing frame unit to the equivalent grid arrangements located on the previously prepared drawing surface. Other features of the present invention will be apparent by reference to the following specifications and to the drawing.

IN THE DRAWING

FIG. 1 is a front perspective view of a movable grid drawing frame embodying the present invention. It shows two flat frames, 1 and 2, separated by spacers 3, 4, 5 and 6 at the four corners of the drawing frame unit. In addition FIG. 1, shows a number of sliders, 9 through 24, to which elastic grid strings are attached. Number 25 illustrates a typical elastic grid string. Sliders 9 and 10 are shown extended away from the drawing frame unit as they might be if the elastic grid string 25 were stretched to its limit, otherwise sliders 9 and 10 would be in contact with the drawing frame unit's edges as shown for all other sliders, 11 through 24. The positions of sliders 17 and 18 demonstrate how elastic grid strings may be moved into diagonal arrangements accomplished by crossing the elastic grid string attached to slider 18 behind or in front of the grid strings attached to sliders 20, 22 and 24. The slot 7 between the two flat frames 1 and 2, which is present on all four sides of the drawing frame, is wide enough to provide enough clearance for elastic grid strings to pass each other when they are crossed as as shown in FIG. 1. Since all elastic grid strings are stretchable the grid string attached to sliders 17 and 18 will stretch when assuming the diagonal position shown. Facilitation of this crossing of elastic grid strings is accomplished by serially lifting sliders 20, 22 and 24 as the elastic grid string attached to slider 18 is crossed into the position shown in FIG. 1.

When in use sliders 9 through 24 may be moved along the drawing frame unit's edges in order to position the elastic grid strings in ways that best meet the requirements of the user. Once the patern of elastic grid string arrangements in the drawing frame has been determined the use then lightly copies, in pencil or charcoal, the same arrangement onto the intended working surface. Thereafter the user sketches what is observed through the elastic grid string arrangement onto the working surface. In doing so the user is able to observe the smaller increments of the subject being drawn as defined by any partiuclar elastic grid string opening which has earlier been defined by the arrangement of the elastic grid strings in the drawing frame unit.

While one embodiment of the invention has been disclosed, it will be apparent to those skilled in the art that the disclosed embodiment may be modified. Therefore, the foregoing description is to be considered exemplary rather than limiting and the true scope of the invention is that defined in the following claims.

I claim:

1. A movable grid drawing frame comprising:
   a flat drawing frame unit made up of two identical four sided flat frames; four thin spacers positioned at the four corners of said individual flat frames so as to separate the frames enough to provide a narrow slot between them, said slot being uninterrupted along the full length of each edge of said drawing frame unit, except at the corners where the thin spacers connect the individual flat frames together into a single unit.
   a number of individual elastic grid strings inserted through the narrow slots created between the two individual flat frames, said elastic grid strings to span, vertically and horizontally, the open area contained by the four inside edges of the drawing frame unit;
   two sliders, bead or button like units, per installed grid string, one attached to each end of each individual grid string so that all grid strings are stretched under slight tension between the outside edges of the drawing frame unit, said sliders riding on the outside edges of said drawing frame unit.

2. A movable grid drawing as described in claim 1 in which the slots created by the double frame retain the grid strings and their sliders as an integral part of the frame assembly but allows them to be freely movable within the confines of the frame slots, whereby the user is able to move or cross the strings along all four sides of the frame while at the same time the strings themselves are held captive in the frame assembly and will not become separated from it, thereby preventing the strings from becoming tangled or lost since they are retained as a part of the frame assembly.

3. A movable grid drawing frame as defined in claim 1 in which positioning of the strings is made possible by the sliders which are attached to each end of the strings, the sliders thus enabling the user to change the position of individual strings by grasping any particular string's slider and moving it up or down, or from side to side, as the case dictates, whereby by grasping two different sliders on the same side of the frame and exchanging their position, the strings attached to them will be crossed as might be required by a subject under observation, as for example in the case of perspective.

* * * * *